(12) United States Patent
Kim et al.

(10) Patent No.: US 10,674,077 B2
(45) Date of Patent: Jun. 2, 2020

(54) APPARATUS AND METHOD FOR PROVIDING MIXED REALITY CONTENT

(71) Applicant: Electronics and Telecommunications Research Institute, Daejeon (KR)

(72) Inventors: Nack Woo Kim, Seoul (KR); Byung Tak Lee, Suwon-si (KR); Sei Hyoung Lee, Gwangju (KR); Hyun Yong Lee, Gwangju (KR); Hyung Ok Lee, Gwangju (KR); Young Sun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 183 days.

(21) Appl. No.: 15/794,191

(22) Filed: Oct. 26, 2017

(65) Prior Publication Data

US 2019/0089898 A1    Mar. 21, 2019

(30) Foreign Application Priority Data

Sep. 19, 2017    (KR) .................. 10-2017-0120574

(51) Int. Cl.
*H04N 5/232*    (2006.01)
*H04N 5/247*    (2006.01)
(Continued)

(52) U.S. Cl.
CPC ..... *H04N 5/23238* (2013.01); *G06K 9/00671* (2013.01); *G06K 9/3241* (2013.01); *G06K 9/6273* (2013.01); *G06T 15/205* (2013.01); *H04N 5/247* (2013.01); *H04N 5/44504* (2013.01); *H04N 21/81* (2013.01); *H04N 21/85406* (2013.01); *G01S 19/01* (2013.01);
(Continued)

(58) Field of Classification Search
CPC ...... G02B 2027/014; G02B 2027/0138; G02B 2027/0141; G06T 19/006; H04N 5/23238; H04N 5/247; H04N 5/44504; G06K 9/00671; G06K 2209/27; G05B 2219/32014; G05B 23/0216; G05B 19/4183
See application file for complete search history.

(56) References Cited

U.S. PATENT DOCUMENTS 5,086,479 A * 2/1992 Takenaga ............. G06K 9/66
382/157
7,814,122 B2 * 10/2010 Friedrich ............. G05B 19/409
707/796
(Continued)

FOREIGN PATENT DOCUMENTS

FR    2990286 A1 * 11/2013 ........... G06T 19/006
KR    10-2015-0048821    5/2015
(Continued)

*Primary Examiner* — David E Harvey
(74) *Attorney, Agent, or Firm* — Kile Park Reed & Houtteman PLLC

(57) ABSTRACT

A mixed reality content providing apparatus is disclosed. The mixed reality content providing apparatus may recognize an OOI included in a 360-degree VR image to generate metadata of the OOI and may provide a user with mixed reality content where the metadata is overlaid on the 360-degree VR image.

13 Claims, 10 Drawing Sheets

(51) Int. Cl.
  *H04N 5/445*   (2011.01)
  *G06K 9/00*    (2006.01)
  *H04N 21/854*  (2011.01)
  *G06K 9/32*    (2006.01)
  *G06T 15/20*   (2011.01)
  *G06K 9/62*    (2006.01)
  *H04N 21/81*   (2011.01)
  *G01S 19/01*   (2010.01)
  *G06T 3/40*    (2006.01)
  *G06T 19/00*   (2011.01)

(52) U.S. Cl.
  CPC ....... *G06K 9/6228* (2013.01); *G06K 2209/27* (2013.01); *G06T 3/4038* (2013.01); *G06T 19/006* (2013.01)

(56) References Cited

U.S. PATENT DOCUMENTS

| | | | |
|---|---|---|---|
| 9,713,871 B2* | 7/2017 | Hill | B25J 9/1666 |
| 10,007,413 B2* | 6/2018 | Hill | G06F 3/04847 |
| 2007/0164988 A1* | 7/2007 | Ryu | G06F 3/013 |
| | | | 345/156 |
| 2008/0100570 A1* | 5/2008 | Friedrich | G05B 19/409 |
| | | | 345/156 |
| 2011/0214072 A1* | 9/2011 | Lindemann | G01C 11/02 |
| | | | 715/757 |
| 2012/0154439 A1 | 6/2012 | Ahn et al. | |
| 2015/0213650 A1 | 7/2015 | Barzuza et al. | |
| 2015/0215351 A1 | 7/2015 | Barzuza et al. | |
| 2015/0215581 A1 | 7/2015 | Barzuza et al. | |
| 2015/0244987 A1 | 8/2015 | Delegue et al. | |
| 2016/0005229 A1* | 1/2016 | Lee | G06F 3/0488 |
| | | | 345/419 |
| 2016/0232708 A1 | 8/2016 | Kim et al. | |
| 2016/0284128 A1* | 9/2016 | Michalscheck | G06T 19/006 |
| 2017/0108838 A1* | 4/2017 | Todeschini | G05B 15/02 |
| 2018/0130260 A1* | 5/2018 | Schmirler | G06T 19/006 |
| 2018/0249343 A1* | 8/2018 | Priest | G06Q 10/0875 |

FOREIGN PATENT DOCUMENTS

| | | |
|---|---|---|
| KR | 10-2015-0099401 | 8/2015 |
| KR | 10-1634966 | 6/2016 |

\* cited by examiner

FIG. 3

| POSITION | MODIFICATION PATCH | 1 | 2 | 3 | 4 | 5 | 6 | 7 | 8 | ... | N |
|---|---|---|---|---|---|---|---|---|---|---|---|
| | LATITUDE | +30° | +30° | +45° | +45° | +60° | +0° | -30° | -60° | ... | -90° |
| | LONGITUDE | ±0°, ±90°, ±180° | ±45°, ±135° | ±45°, ±135° | ±0°, ±90°, ±180° | ±45°, ±135° | ±0°, ±90°, ±180° | ±45°, ±135° | ±45°, ±135° | | ±45°, ±135° |

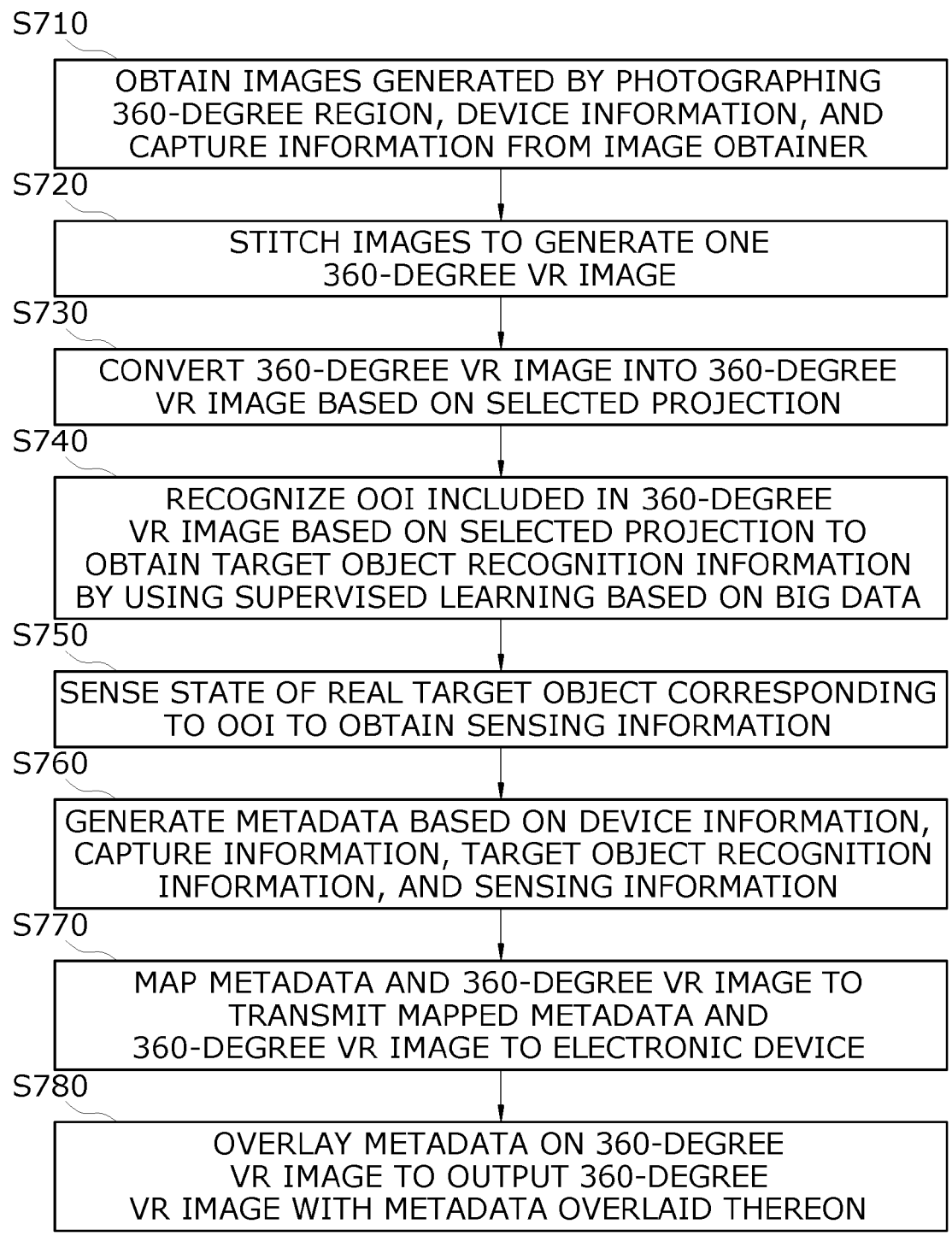

FIG. 8

S761 — GENERATE DEVICE ID TABLE INCLUDING MANUFACTURER NAME OF CAMERA, NUMBER OF CAMERAS WHICH HAVE PHOTOGRAPHED THE 360-DEGREE REGION, CAMERA RIG INFORMATION, AND SERIAL NUMBER OF EACH OF CAMERAS, EXTRACTED FROM DEVICE INFORMATION

S763 — GENERATE CAPTURE ID TABLE INCLUDING GPS INFORMATION ABOUT CAMERA, COMPASS INFORMATION ABOUT IMAGE, TIME STAMP, AND FILE NAME OF IMAGE, EXTRACTED FROM CAPTURE INFORMATION

S765 — GENERATE TARGET OBJECT ID TABLE INCLUDING TARGET OBJECT NAME OF OOI, TYPE OF SELECTED PROJECTION, AND POSITION AND SIZE OF OOI INCLUDED IN 360-DEGREE VR IMAGE BASED ON SELECTED PROJECTION, EXTRACTED FROM TARGET OBJECT RECOGNITION INFORMATION

S767 — GENERATE SENSING INFORMATION ID TABLE INCLUDING GPS INFORMATION AND STATE INFORMATION ABOUT REAL TARGET OBJECT, EXTRACTED FROM SENSING INFORMATION

APPARATUS AND METHOD FOR PROVIDING MIXED REALITY CONTENT

CROSS-REFERENCE TO RELATED APPLICATIONS

This application claims priority under 35 U.S.C. § 119 to Korean Patent Application No. 10-2017-0120574, filed on Sep. 19, 2017, the disclosure of which is incorporated herein by reference in its entirety.

TECHNICAL FIELD

The present invention relates to an apparatus and method of providing mixed reality content, and more particularly, to an apparatus and method of providing mixed reality content based on a 360-degree virtual reality image.

BACKGROUND 360-degree virtual reality (VR) technology denotes technology that unlike general VR, processes a plurality of images obtained by photographing a 360-degree region according to various image processing techniques to provide a sense of realism and immersiveness to a user by using an image display device such as a head-mounted display (HMD).

The plurality of images obtained by photographing the 360-degree region may be obtained by using one parabolic lens, a plurality of fish eye lenses, or a camera group equipped with a plurality of general lenses.

The plurality of images obtained by using the camera group are converted into one equirectangular image through a stitching process. Here, the stitching process denotes a work of stitching the plurality of images.

The equirectangular image enables a user to watch a 360-degree VR image through an image display device such as an HMD capable of reproducing a panorama image.

The 360-degree VR technology may be applied monitoring of situations of industrial sites, maintenance, repair, and product and component prototyping, in addition to the fields of game and education.

The 360-degree VR technology developed to date is restrictively applied to video-on demand (VoD) broadcasting or real-time broadcasting, but is not used as a solution for analyzing various situations occurring in industrial sites in real time.

SUMMARY

Accordingly, the present invention provides an apparatus and method of providing mixed reality content for analyzing various situations in real time.

The objects of the present invention are not limited to the aforesaid, but other objects not described herein will be clearly understood by those skilled in the art from descriptions below.

In one general aspect, a mixed reality content providing method includes obtaining a plurality of images generated by photographing a 360-degree region, device information, and capture information from an image obtainer including a plurality of cameras, stitching the plurality of images to generate one 360-degree virtual reality (VR) image, converting the one 360-degree VR image into a 360-degree VR image based on a selected projection, recognizing a target object of interest (OOI) included in the 360-degree VR image based on the selected projection to obtain target object recognition information; sensing, by a sensor unit, a state of a real target object corresponding to the OOI to obtain sensing information, generating metadata, based on the device information, the capture information, the target object recognition information, and the sensing information, and mapping the metadata and the 360-degree VR image based on the selected projection to generate mixed reality content and providing the mixed reality content to an electronic device.

In another general aspect, a mixed reality content providing apparatus includes an image obtainer including a plurality of cameras and outputting a plurality of images generated by photographing a 360-degree region with the plurality of cameras, device information about the plurality of cameras, and capture information generated in an operation of capturing the plurality of images, a stitching unit stitching the plurality of images to generate one 360-degree virtual reality (VR) image, an image converter converting the one 360-degree VR image into a 360-degree VR image based on a selected projection, an object recognizer outputting target object recognition information obtained by recognizing a target object of interest (OOI) included in the 360-degree VR image based on the selected projection, a sensor unit sensing a state of a real target object corresponding to the OOI to output sensing information, and a mixed reality managing server generating metadata, based on the device information, the capture information, the target object recognition information, and the sensing information, mapping the metadata and the 360-degree VR image based on the selected projection to generate mixed reality content, and providing the mixed reality content to an electronic device for displaying the mixed reality content.

Other features and aspects will be apparent from the following detailed description, the drawings, and the claims.

BRIEF DESCRIPTION OF THE DRAWINGS

FIG. 3 is a diagram illustrating an example of a modification patch representing a modification degree of an image when a 360-degree VR image according to an embodiment of the present invention is modified based on the equirectangular projection.

FIG. 7 is a flowchart illustrating a mixed reality content providing method according to an embodiment of the present invention.

FIG. 8 is a flowchart illustrating in detail an operation of generating metadata illustrated in FIG. 7.

DETAILED DESCRIPTION OF EMBODIMENTS

Figure 1:
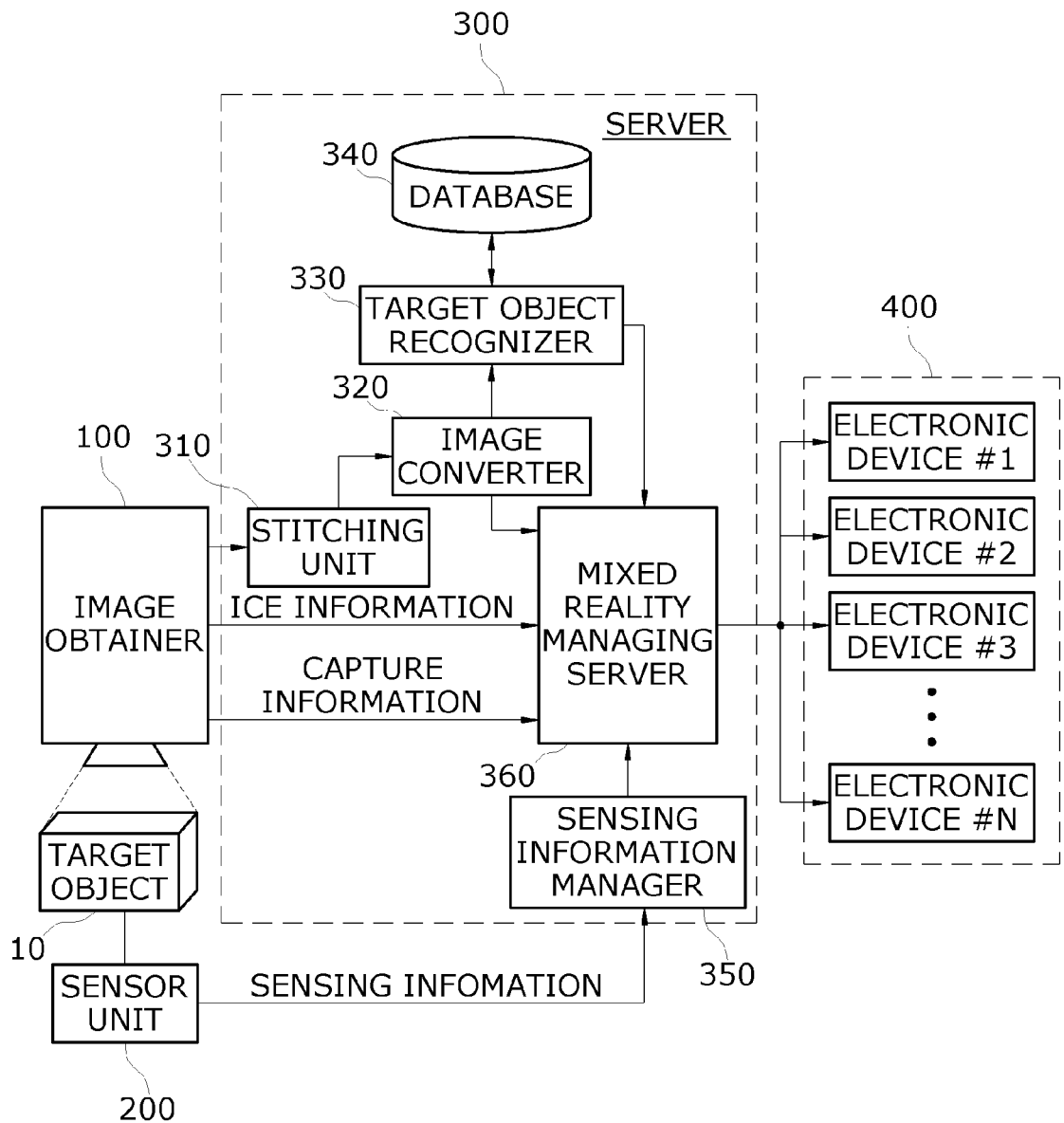
FIG. 1 is a block diagram of a mixed reality content providing apparatus according to an embodiment of the present invention.

Embodiments of the present invention are provided so that this disclosure will be thorough and complete, and will fully convey the concept of the present invention to one of ordinary skill in the art. Since the present invention may have diverse modified embodiments, preferred embodiments are illustrated in the drawings and are described in the detailed description of the present invention. However, this does not limit the present invention within specific embodiments and it should be understood that the present invention covers all the modifications, equivalents, and replacements within the idea and technical scope of the present invention. In describing the present invention, a detailed description of known techniques associated with the present invention unnecessarily obscure the gist of the present invention, it is determined that the detailed description thereof will be omitted.

It will be understood that although the terms including an ordinary number such as first or second are used herein to describe various elements, these elements should not be limited by these terms. These terms are only used to distinguish one element from another element.

The terms of a singular form may include plural forms unless referred to the contrary. The meaning of 'comprise', 'include', or 'have' specifies a property, a region, a fixed number, a step, a process, an element and/or a component but does not exclude other properties, regions, fixed numbers, steps, processes, elements and/or components.

In this disclosure below, each of terms such as " . . . unit", " . . . apparatus" and "module" described in specification denotes an element for performing at least one function or operation, and may be implemented in hardware, software or the combination of hardware and software. Also, except "module" or "unit" needed to be implemented in hardware, a plurality of "modules" or a plurality of "units" may be integrated into at least one module and implemented as at least one processor (not shown).

FIG. 1 is a block diagram of a mixed reality content providing apparatus 500 according to an embodiment of the present invention.

Referring to FIG. 1, the mixed reality content providing apparatus 500 according to an embodiment of the present invention may include an image obtainer 100, a sensor unit 200, a server 300, and a plurality of electronic devices 400.

The image obtainer 100 may include a plurality of cameras. The plurality of cameras may be disposed to photograph a 360-degree region. Therefore, the plurality of cameras may photograph a real target object 10 located in an arbitrary region in the 360-degree region. The plurality of cameras may each be a dedicated camera for photographing a 360-degree VR image.

In other embodiments, the image obtainer 100 may be configured with one camera. In this case, the one camera may photograph the 360-degree region while rotating.

The image obtainer 100 may photograph the 360-degree region to obtain a plurality of images and may provide the plurality of images to the server 300. The plurality of images may be referred to as a 360-degree VR image. In this case, the 360-degree VR image may be an unstitched image.

Moreover, the image obtainer 100 may obtain device information including a manufacturer name of a camera in addition to the plurality of images, the number of cameras which have photographed the 360-degree region, camera rig information, and a serial number of each of the cameras and may provide the device information to the server 300. Here, the camera rig information may be information representing an arrangement type where the cameras are arranged. The arrangement type of the cameras may include, for example, a cubic type or a sphere type.

Moreover, the image obtainer 100 may provide the server 300 with image obtainment information (hereinafter referred to as capture information) which is generated in a process of obtaining the 360-degree VR image.

The capture information may include camera global positioning system (GPS) information (or position information), compass information about each of the plurality of images, a time stamp, a file name of the 360-degree VR image, etc. The compass information may be information representing a viewpoint of each of the plurality of cameras.

The image obtainer 100 may transmit the plurality of image, the device information, and the capture information to the server 300 through wired or wireless communication. In order to support the wired or wireless communication, although not shown, the image obtainer 100 may include a communication interface, including an appropriate modem, an amplifier, a filter, and a frequency conversion part, and a hardware part such as a processor for controlling an operation of the communication interface.

The sensor unit 200 may include a plurality of sensor modules. The plurality of sensor modules may sense GPS information, a physical amount, a static state, and a dynamic state of the real target object 10 to provide sensing information to the server 300. The sensing information may include, for example, state information of a corresponding target object such as GPS information (or position information), a size, a temperature state, a noise state, a heating state, and a charging state of the real target object 10.

The sensor unit 200 may include, for example, at least one of a gesture sensor, a GPS sensor, a gyro sensor, a pressure sensor, a magnetic sensor, an acceleration sensor, a grip sensor, a proximity sensor, a color sensor, a bio sensor, a temperature/humidity sensor, a noise measurement sensor, a battery sensor measuring a charging state of a battery, an illumination sensor, and an ultraviolet sensor.

If a target which is to be sensed by the sensor unit 200 is a person, the sensor unit 200 may additionally or alternatively include an E-nose sensor, an electromyography (EMG) sensor, an electroencephalogram (EEG) sensor, an electrocardiogram (ECG) sensor, an infrared (IR) sensor, an iris sensor, and a fingerprint sensor.

Although not shown, the sensor unit 200 may include a processor for controlling one or more sensors included therein and a memory that permanently or temporarily stores information (data) generated in a processing operation performed by the processor.

Moreover, the sensor unit 200 may transmit the sensing information to the server 300 by using wired or wireless communication, for providing the sensing information to the server 300. In order to support the wired or wireless communication, although not shown, the sensor unit 200 may include a communication interface including an appropriate modem, an amplifier, a filter, and a frequency conversion part.

The server 300 may generate mixed reality content from the plurality of images, the device information, and the capture information provided from the image obtainer 100 and the sensing information provided from the sensor unit 200.

Moreover, the server 300 may provide the generated mixed reality content to electronic devices 400 (#1, #2, #3, . . . , and #N) of users who are watching the 360-degree VR image (or 360-degree VR image content).

Moreover, the server 300 may multiplex voice dialog streaming between the users watching the same 360-degree VR image to manage the voice dialog streaming as one channel and may transmit the mixed reality content and the multiplexed voice dialog streaming to the electronic devices 400 of the users.

In order to generate the mixed reality content, the server 300 may include a stitching unit 310, an image converter 320, a target object recognizer 330, a database (DB) 340, a sensing information manager 350, and a mixed reality managing server 360.

The stitching unit 310 may stitch the plurality of images from the image obtainer 100, based on an image stitching algorithm to generate the 360-degree VR image.

A stitching method may representatively include a feature point extracting operation, a matching point extracting operation, and a matching operation. The feature point extracting operation may be an operation of searching for a region of interest (ROI) in an input image and extracting a feature point from the found ROI. Here, the ROI may include a corner region of the input image and a blob region corresponding to a region where foreground pixels having a pixel value having a certain level or more are connected. The matching point extracting operation may be an operation of expressing an extracted feature point as a feature vector to generate a feature point descriptor and extracting matching points corresponding to each other from the ROI of the input image and an ROI of a reference image by using the generated feature point descriptor. Here, distance information between the feature point descriptors may be used for extracting the matching points corresponding to each other. Finally, the matching operation may be an operation of matching the input image and the reference image by using the extracted matching point. The stitching method may be performed on all of the plurality of images, and thus, one stitched 360-degree VR image may be generated.

In order to assign a sense of reality (a sense of three dimensions) to the stitched 360-degree VR image, the image converter 320 may convert the stitched 360-degree VR image into an image projected onto an image coordinate system defined in a selected projection. For example, the image converter 320 may convert image coordinates of the stitched 360-degree VR image into image coordinates capable of being expressed in an equirectangular coordinate system including latitude and longitude. The stitched 360-degree VR image may be converted into an image capable of being expressed in an image coordinate system defined in various projections such as the sphere projection, the cube projection, the mirror ball projection, and the Mercator's projection. There is no special limitation, and in the present embodiment, the stitched 360-degree VR image may be converted into an equirectangular 360-degree VR image.

Figure 2:
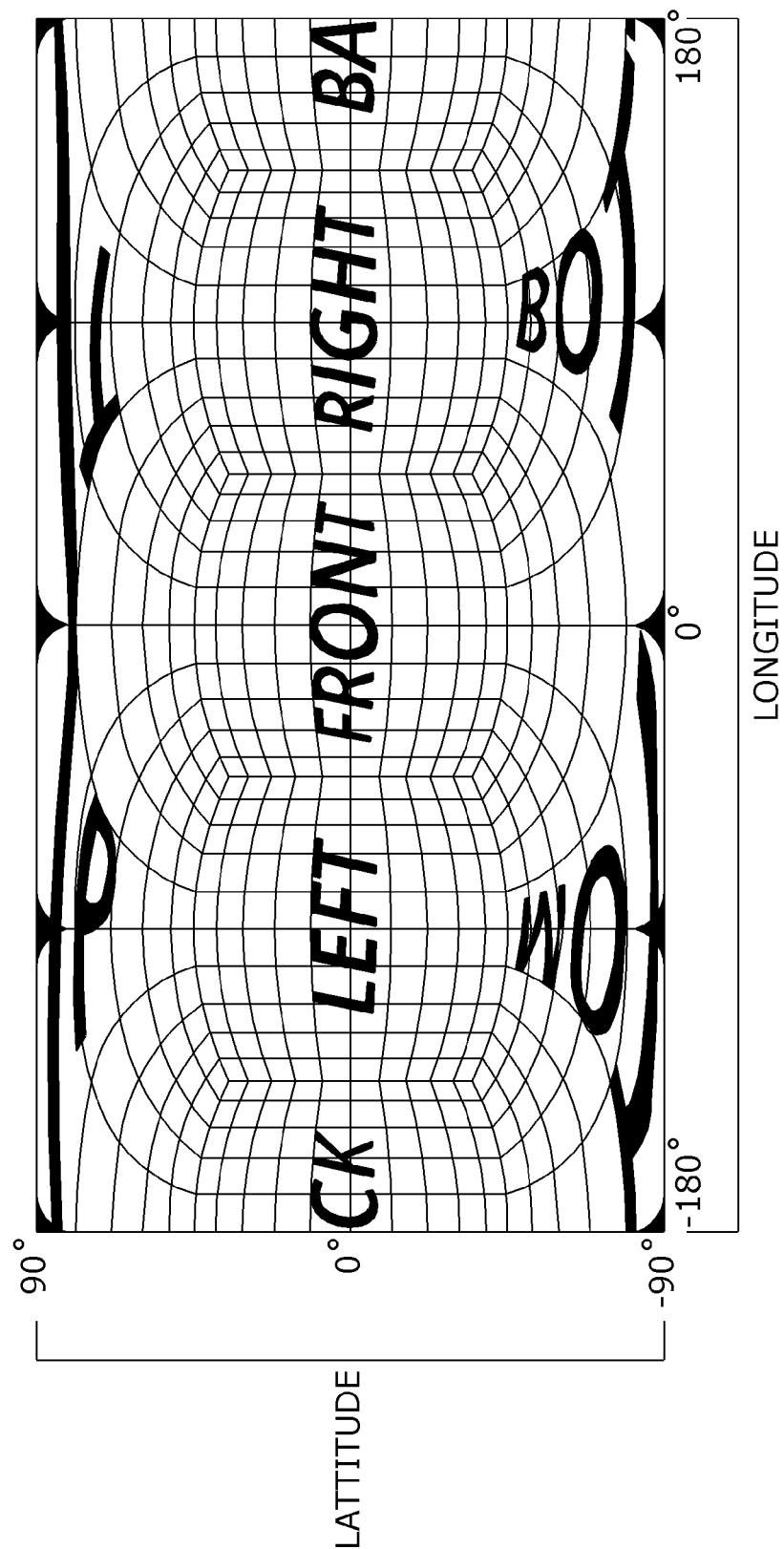
FIG. 2 is a diagram illustrating a method of displaying a 360-degree VR image based on the equirectangular projection according to an embodiment of the present invention.

FIG. 2 is a diagram illustrating a method of displaying a 360-degree VR image based on the equirectangular projection according to an embodiment of the present invention.

Referring to FIG. 2, a 360-degree VR image based on the equirectangular projection may be an image expressed in an equirectangular coordinate system. The equirectangular coordinate system may include an abscissa axis representing longitude having a range of −180 degrees to +180 degrees and an ordinate axis representing latitude having a range of −90 degrees to +90 degrees.

Referring again to FIG. 1, the target object recognizer 330 may recognize a target object of interest (OOI) corresponding to the real target object 10 in an equirectangular 360-degree VR image obtained through conversion by the image converter 320 and may provide the mixed reality managing server 360 with target object recognition information which is a result of the recognition.

Examples of an OOI recognizing method may include an image recognition method based on feature information extracted from an equirectangular 360-degree VR image and an image recognition method based on deep learning.

In an image recognition method based on a feature vector, the target object recognizer 330 may extract feature information (for example, a feature pattern or a feature vector) about an OOI in the equirectangular 360-degree VR image by using various image processing algorithms such as a target object extracting or target object tracking algorithm. The technical feature of the present invention does not limit an image processing algorithm for extracting feature information about an OOI, and thus, technology well known to those skilled in the art is applied thereto.

When the feature information is extracted, the target object recognizer 330 may search the database 340 that stores pieces of reference feature information learned through supervised learning based on big data and target object names assigned to the pieces of reference feature information, compare the extracted feature information and the pieces of reference feature information, search for reference feature information which matches the extracted feature information or has a high similarity score with the extracted feature information, based on a result of the comparison and recognize the OOI by checking a target object name assigned to the found reference feature information.

For robust target object recognition, in the present embodiment, the pieces of reference feature information may be learned in an image captured in various illuminations and conditions or a plurality of blurred target object images.

Moreover, in the present embodiment, since the feature information about the target object 10 extracted from the equirectangular 360-degree VR image is recognized, the pieces of reference feature information may be learned in target object images obtained through modification based on the equirectangular projection. That is, the pieces of reference feature information may be learned while variously modifying a target object included in an image according to a modification patch representing a position-based modification degree in the target object images obtained through the modification.

FIG. 3 illustrates an example of a modification patch representing a modification degree of an image when a 360-degree VR image according to an embodiment of the present invention is modified based on the equirectangular projection.

In a case where the pieces of reference feature information are learned in a target object image obtained through various modifications based on modification patches illustrated in FIG. 3, more robust target object recognition is performed. In a case where a stitched 360-degree VR image is modified based on another projection such as the Mercator's projection in addition to the equirectangular projection, the pieces of reference feature information may be learned in target objects obtained through modification based on a modification patch of the other projection.

In the image recognition method based on deep learning, the target object recognizer 330 may recognize the OOI, based on deep learning such as a convolution neural network (CNN), a deep belief network (DBN), and an auto encoder (AE).

In detail, the target object recognizer 330 may apply a plurality of target object images, stored in the database 340, to a deep network model configured for recognition of an OOI, based on supervised learning, thereby learning a parameter of the deep network model. In this case, data augmentation is needed for learning of the target object images. This is because a 360-degree VR image is image-modified through stitching, based on the equirectangular projection. Therefore, if the existing target object image for which image modification is not performed is learned as-is, a target object recognition error increases, and thus, as in FIG. 3, an error should be reduced by learning an input image through data augmentation, based on various modification patches. A method of learning an OOI and a method of recognizing an OOI may all be executed with respect to a time when a 360-degree VR image is stitched based on a specific projection and image distortion occurs.

Referring again to FIG. 1, the sensing information manager 350 may collect sensing information obtained by the sensor unit 200 sensing a physical amount, a static state, and a dynamic state of the real target object 10 and may provide the sensing information to the mixed reality managing server 360. In order to collect the sensing information, the sensing information manager 350 may receive the sensing information from the sensor unit 200 through wired or wireless communication. In order to support the wired or wireless communication, although not shown, the sensing information manager 350 may include a communication interface, including an appropriate modem, an amplifier, a filter, and a frequency conversion part, and a hardware part such as a processor for controlling an operation of the communication interface.

The mixed reality managing server 360 may generate mixed reality content and may provide the generated mixed reality content to electronic devices of viewers who are watching the same mixed reality content.

In order to generate the mixed reality content, the mixed reality managing server 360 may generate metadata of the real target object 10. The metadata may be generated based on device information and capture information provided from the image obtainer 100, a target object recognition result provided from the target object recognizer 330, and the sensing information provided from the sensing information manager 350.

The mixed reality managing server 360 may combine the generated metadata and an equirectangular 360-degree VR image from the image converter 320 by using one multiplexing channel and may provide the combined metadata and equirectangular 360-degree VR image to a plurality of electronic devices 400 (#1, #2, #3, . . . , and #N). At this time, the mixed reality managing server 360 may additionally combine audio stream information associated with the equirectangular 360-degree VR image or the metadata.

The electronic devices 400 (#1, #2, #3, . . . , and #N) may be provided with the metadata and the equirectangular 360-degree VR image from the mixed reality managing server 360, overlay the metadata on the equirectangular 360-degree VR image in a text type, and provide the overlaid metadata and equirectangular 360-degree VR image to a user. The user may analyze various situations in real time, based on the metadata overlaid on the equirectangular 360-degree VR image. At this time, when the electronic devices 400 (#1, #2, #3, . . . , and #N) are additionally provided with the audio stream information from the mixed reality managing server 360, the user may acoustically analyze the various situations, based on the audio stream information.

The electronic devices 400 (#1, #2, #3, . . . , and #N) may selectively use a function of overlaying the metadata on the equirectangular 360-degree VR image. That is, the overlay function may be on/off according to a selection of the user. This is because if a specific situation can be analyzed by using only a 360-degree VR image, metadata for explaining the specific situation is not needed.

In the present embodiment, it is described that an operation of overlaying the metadata on the equirectangular 360-degree VR image is performed by the electronic devices 400 (#1, #2, #3, . . . , and #N), but the operation may be performed by the mixed reality managing server 360. In this case, the electronic devices 400 (#1, #2, #3, . . . , and #N) may be provided with the 360-degree VR image with the metadata overlaid thereon.

The electronic devices 400 (#1, #2, #3, . . . , and #N) may be all kinds of display devices that provide virtual reality (VR) and augmented reality (AR) in addition to the mixed reality content.

Each of the electronic devices 400 (#1, #2, #3, . . . , and #N) may be configured to have a communication function of receiving the mixed reality content from the mixed reality managing server 360 through wired or wireless communication. In order to support the wired or wireless communication, although not shown, the electronic devices 400 (#1, #2, #3, . . . , and #N) may each include a communication interface, including an appropriate modem, an amplifier, a filter, and a frequency conversion part, and a hardware part such as a processor for controlling an operation of the communication interface.

In some embodiments, examples of the electronic devices 400 (#1, #2, #3, . . . , and #N) may include at least one of a smartphone, a tablet personal computer (PC), a mobile phone, an image phone, an e-book reader, a desktop PC, a laptop PC, a netbook computer, a workstation, a server, a personal digital assistant (PDA), a portable multimedia player (PMP), an MP3 player, a mobile medical device, a camera, and a wearable device. Examples of the wearable device may include at least one of accessories (for example, a watch, a ring, a bracelet, an anklet, a necklace, glasses, a contact lens, a head-mounted device (HMD), fabric or clothes integration (for example, electronic clothes), a body-attached device (for example, a skin pad or tattoo), and a bio implantable device (for example, an implantable circuit).

Figure 4:
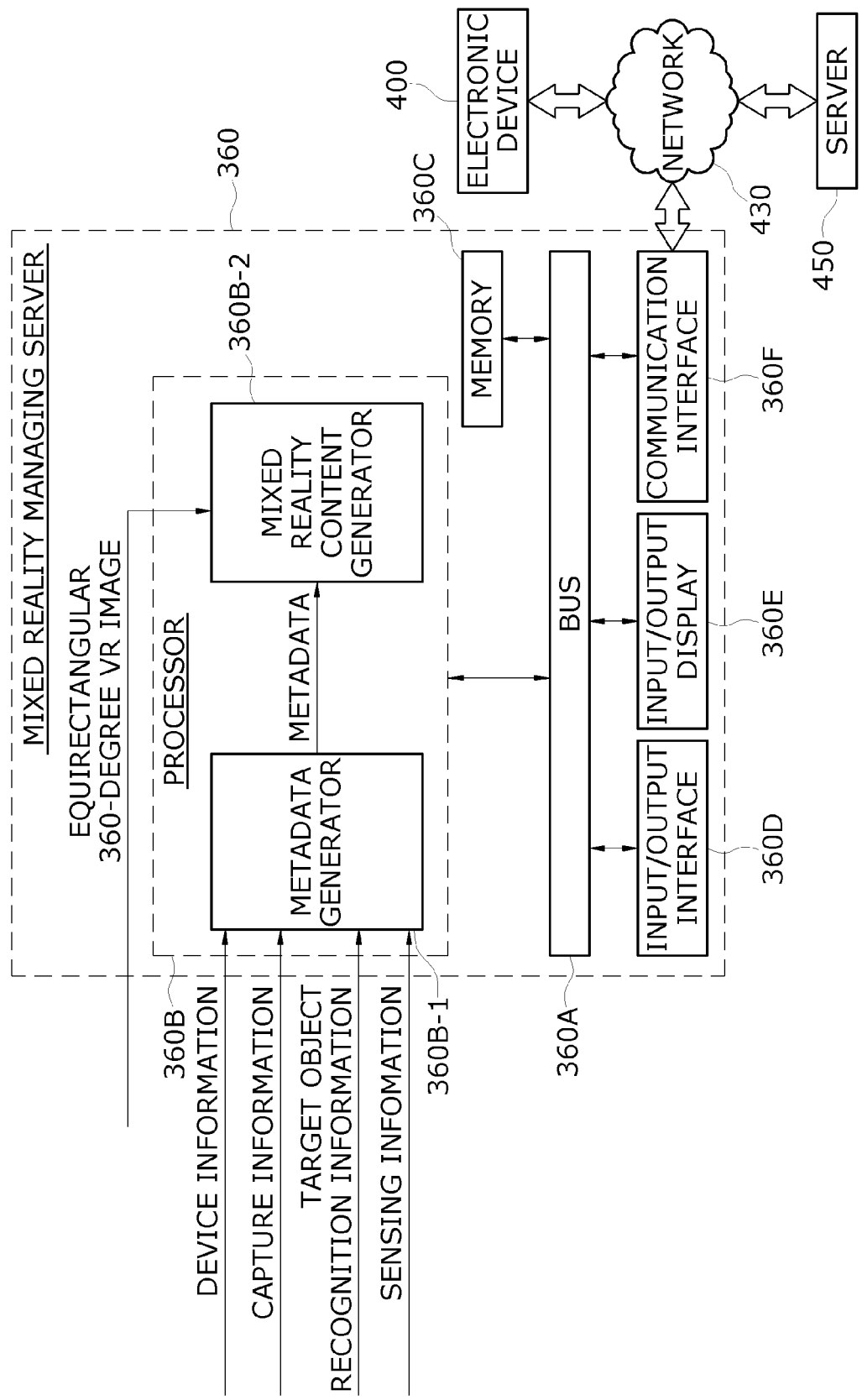
FIG. 4 is a block diagram schematically illustrating an internal configuration of a mixed reality managing server according to an embodiment of the present invention.

FIG. 4 is a block diagram schematically illustrating an internal configuration of a mixed reality managing server 360 according to an embodiment of the present invention.

Referring to FIG. 4, the mixed reality managing server 360 according to an embodiment of the present invention may include a bus 360A, a processor 360B, a memory 360C, an input/output (I/O) interface 360D, a display 360E, and a communication interface 360F.

The bus 360A, for example, may include a circuit that connects the elements 360B to 360F and transfers a control message and/or data between the elements.

The processor 360F may include one or more of a central processing unit (CPU), an application processor (AP), and a communication processor (CP). The processor 120 may execute data processing or an operation on control and/or communication of at least one other element included in the mixed reality managing server 360. Here, the data processing may include generation processing of metadata and image processing associated with target object recognition.

The memory 360C may include a volatile memory and a nonvolatile memory. The memory 360C may store, for example, a command or data associated with at least one other element included in the mixed reality managing server 360. According to an embodiment, the memory 360C may store software and programs. Examples of the programs may include a kernel, a middleware, an application programming interface (API), and/or an application program (or an application). At least some of the kernel, the middleware, and the API may be referred to as an operating system (OS).

The input/output interface 360D, for example, may transfer a command or data, input from a user or another external device, to other element(s) included in the mixed reality managing server 360. Also, the input/output interface 360D may output a command or data, received from other element(s) included in the mixed reality managing server 360, to a manager or another external device.

The display 360E may include, for example, a liquid crystal display (LCD), a light emitting diode (LED) display, an organic light-emitting diode (OLED) display, and/or the like. The display 360E may display, for example, a text, an image, a video, an icon, and/or a symbol capable of being shown to the manager in a process of generating metadata and mixed reality content.

The communication interface 360F may be connected to a network 430 and may communicate with the electronic device 400 and another server (or a webserver) 450 through wireless communication or wired communication. The wired communication may be, for example, a cellular communication protocol, and for example, may use at least one of long-term evolution (LTE), LTE Advance (LTE-A), code division multiple access (CDMA), wideband CDMA (WCDMA), universal mobile telecommunications system (UMTS), wireless broadband (WiBro), and global system for mobile communications (GSM). Also, the wireless communication may include, for example, close-distance communication 164. The close-distance communication 164 may include, for example, at least one of wireless fidelity (WiFi), Bluetooth, near field communication (NFC), and global navigation satellite system (GNSS).

Hereinafter, the above-described main functions and operations of the processor 360B will be described.

The processor 360B may perform a data processing operation of generating metadata and mixed reality content. To this end, the processor 360B may include a metadata generator 360B-1 and a mixed reality content generator 360B-2.

Metadata Generator 360B-1

The metadata generator 360B-1 may generate metadata which is to be overlaid on an equirectangular 360-degree VR image input from the image converter 320. The metadata may include a device identifier (ID) table (or device ID information), a capture ID table (or capture ID information), a target object ID table (or target object ID information), and a sensing information ID table (or sensing information ID information).

The device ID table may be generated based on device information provided from the image obtainer 100 (see FIG. 1). That is, the metadata generator 360B-1 may extract a manufacturer name of a camera, the number of cameras which have photographed a 360-degree region, camera rig information, and a serial number of each of the cameras, which are included in the device information. The metadata generator 360B-1 may generate the device ID table which includes a manufacturer name filed recording the manufacturer name of the camera, a camera number field recording the number of the cameras which have photographed the 360-degree region, a camera rig field recording the camera rig information, and a camera serial number field recording the serial number of each of the cameras.

The capture ID table may be generated based on the capture information provided from the image obtainer 100 (see FIG. 1). That is, the metadata generator 360B-1 may extract camera GPS information (or GPS coordinates or position information) about the image obtainer 100 (see FIG. 1), compass information about each of images configuring a 360-degree VR image, a time stamp when the 360-degree VR image is captured, and a file name of the captured 360-degree VR image, which are included in the capture information. The metadata generator 360B-1 may generate the capture ID table which includes a position field recording the camera GPS information (or position information) about the image obtainer 100 (see FIG. 1), a compass field recording the compass information about the 360-degree VR image, a time stamp field recording the time stamp when the 360-degree VR image is captured, and a file name field recording the file name of the captured 360-degree VR image.

The target object ID table may be generated based on a target object recognition result provided from the target object recognizer 330 (see FIG. 1). That is, the metadata generator 360B-1 may extract a target object name, a projection selected in an image conversion operation performed by the image converter 320, a position of a target object expressed in the selected projection, and a size of the target object expressed in the selected projection, which are included in the target object recognition result. The metadata generator 360B-1 may generate the target object ID table which includes a target object name field recording the target object name, a projection field recording the projection selected in the image conversion operation performed by the image converter 320, a position field recording the position of the target object expressed in the selected projection, and a size field recording the size of the target object expressed in the selected projection.

The sensing information ID table may be generated based on sensing information obtained through sensing by the sensor unit 200 (see FIG. 1). That is, the metadata generator 360B-1 may extract GPS information about the real target object 10 and state information about the real target object 10 (see FIG. 1) measured by the sensor unit 200, which are included in the sensing information. The metadata generator 360B-1 may generate the sensing information ID table which includes a position field recording the GPS information about the real target object 10 and a state field recording the state information about the real target object 10 (see FIG. 1) measured by the sensor unit 200.

The sensing information ID table may further include a target object name field recording a target object name of the rear target object 10 (see FIG. 1) sensed by the sensor unit 200.

Figure 5:
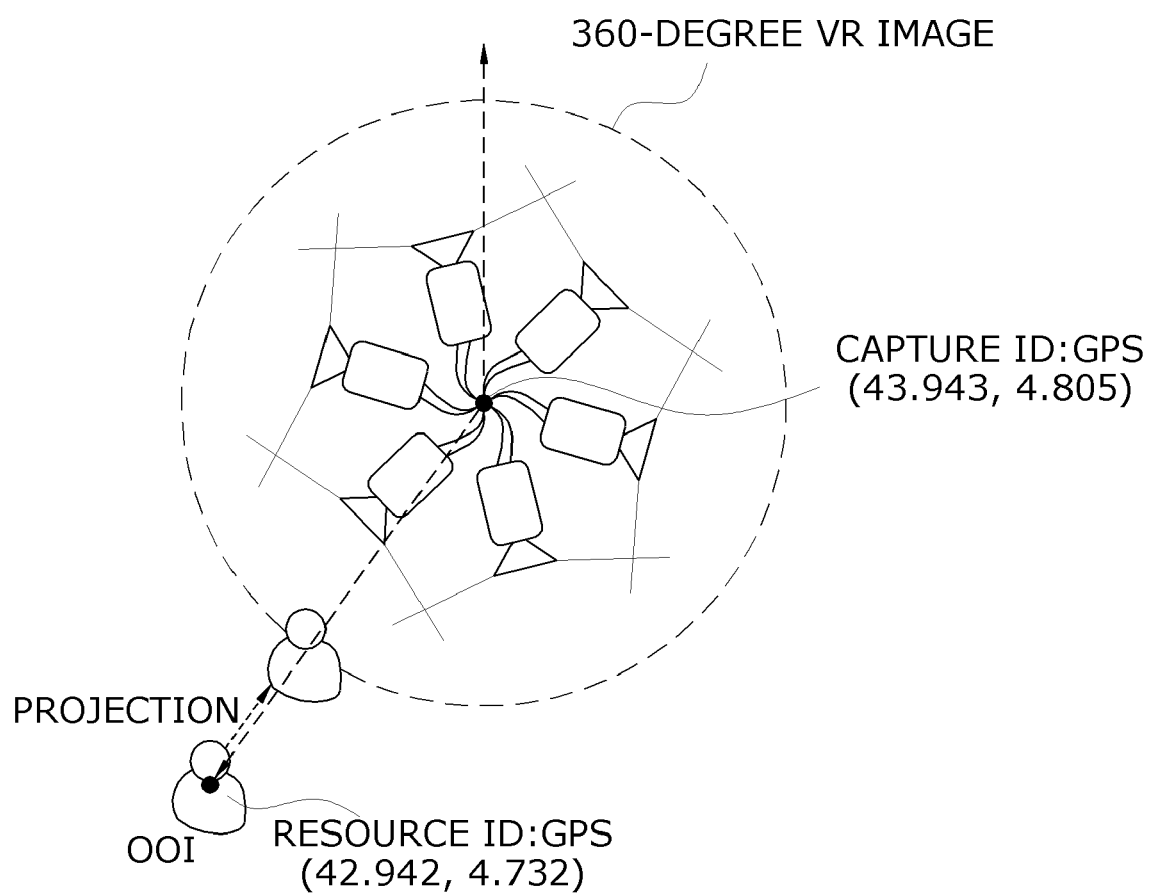
FIG. 5 is a diagram schematically illustrating a method of substituting a target object name, recorded in a target object identifier (ID) table, into a target object name field of a sensing information ID table according to an embodiment of the present invention.

The target object name field of the sensing information ID table may record a target object name which is the same as a target object name recorded in the target object name field of the target object ID table. As shown in FIG. 5, a compass of a target object recognized by the target object recognizer 330 may be determined based on GPS coordinates of a camera (the image obtainer) and compass information about a 360-degree VR image, which are recorded in the capture ID table. In this case, an OOI projected onto the 360-degree VR image may be located on a line which connects GPS coordinates of a real target object (the sensor unit 200 attached on the rear target object 10) and the GPS coordinates of the camera (the image obtainer), which are recorded in the sensing information ID table, and thus, a target object name recorded in the target object name field of the target object ID table may be substituted into the target object name field of the sensing information ID table.

The following Table 1 shows a configuration of metadata according to an embodiment of the present invention.

TABLE 1

| Metadata | Device ID table | Camera manufacturer name | Canon/Nikon/GoPro, ... |
|---|---|---|---|
| | | Number of cameras | 2cam/4cam/6cam, ... |
| | | Camera rig information | integrated/panorama/shpere, ... |
| | | Serial number | 16e2987, ... |
| | | ... | ... |
| | Capture ID table | GPS (position of camera) | 43.943:4.805 |
| | | Compass (compass information about 360-degree VR image) | N/E/W/S position dispaly |
| | | Time Stamp (photographing time) | yyyy:mm:dd::hh:mm:ss:ms |
| | | FileName | filename.mp4, ... |
| | | ... | ... |
| | Sensing information ID table | Target object name | Capacitor bank/Transformer/ESS, ... |
| | | GPS (position of sensor unit attached on real target object) | 42.942:4.732 |
| | | Temperature | 28° C. |
| | | Noise level | 78 dB |
| | | Heating state | 78° C. |
| | | Charging state | 76% |
| | | ... | ... |
| | Target object ID table | Target object name | Capacitor bank/Transformer/ESS, ... |
| | | Kind of projection | Lat-long/Sphere/Cube/MirrorBall, ... |
| | | Position | Lat45°:Long30° |
| | | Size | 10×20 |
| | | ... | ... |

Table 1 shows an example of the metadata when a target object (or a real target object sensed by the sensor unit) recognized from the 360-degree VR image is an energy storage device, and the energy storage device may be, for example, a capacitor bank, a transformer, or the like.

Mixed Reality Content Generator 360B-2

The mixed reality content generator 360B-2 may map an equirectangular 360-degree VR image from the image converter 320 to metadata which corresponds to the equirectangular 360-degree VR image and is provided from the metadata generator 360B-1, thereby generating a mixed reality content set. In this case, the mixed reality content set may further include audio stream information corresponding to the metadata or the equirectangular 360-degree VR image.

The mixed reality content set may be transferred to the communication interface 360F, and the communication interface 360F may transmit the mixed reality content set to an electronic device 400 of a user who is watching the same mixed reality content. In this case, the equirectangular 360-degree VR image and the audio stream information may be mixed by one multiplexing channel and may be transmitted to the electronic device 400.

Figure 6:
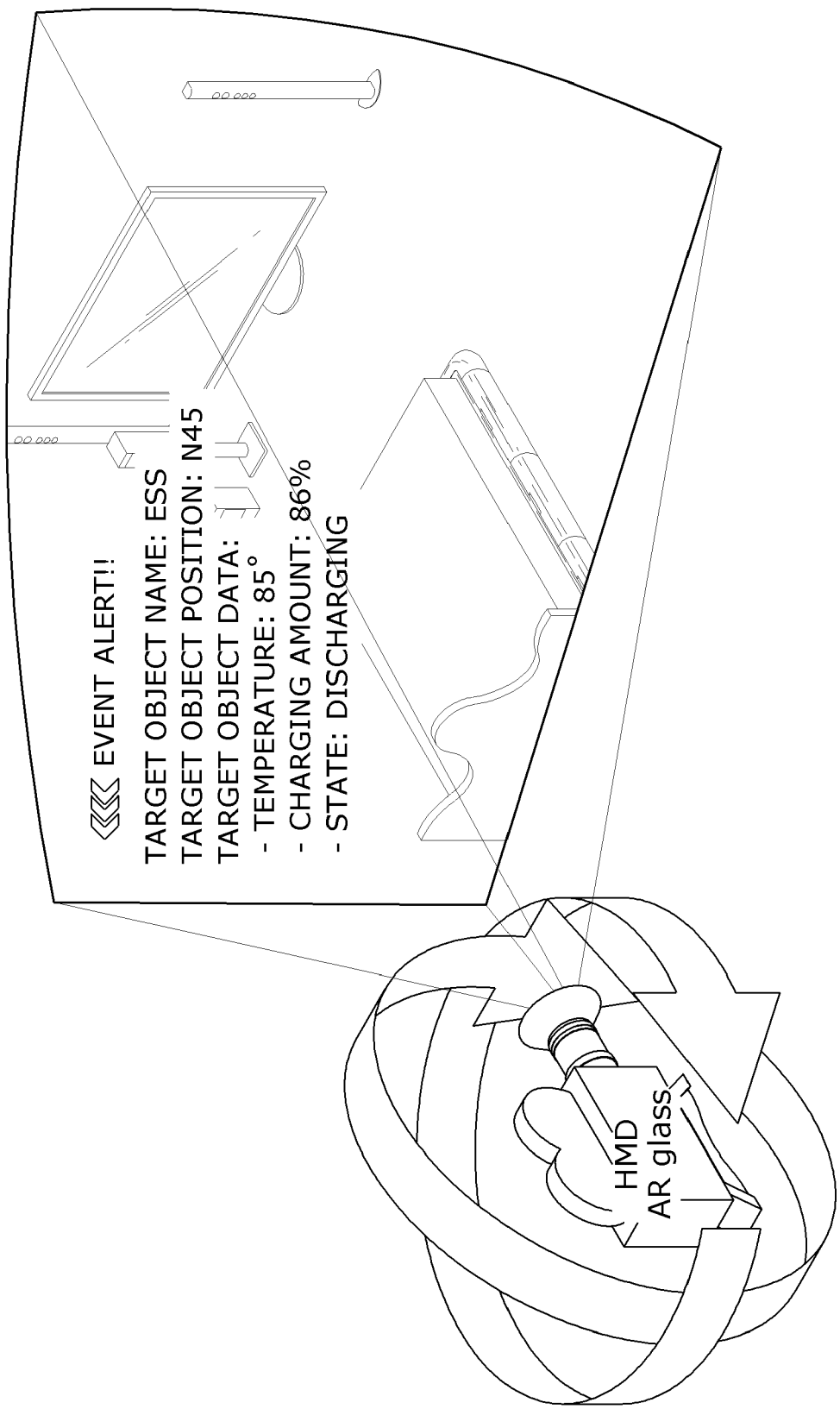
FIG. 6 is a diagram illustrating an example of mixed reality content displayed in an electronic device according to an embodiment of the present invention.

FIG. 6 is a diagram illustrating an example of mixed reality content displayed in an electronic device according to an embodiment of the present invention.

Referring to FIG. 6, in a user wearing AR glasses, an alarm message "EVENT Alert" may be displayed on the left of a 360-degree VR image, and metadata of a target object associated with the "EVENT Alert" may be overlaid and displayed on the 360-degree VR image. At this time, users are watching the same 360-degree VR image, but can watch images corresponding to different compasses depending on a field of view.

FIG. 6 shows mixed reality content where only some (for example, target object state information such as a target object name, a position of the target object, a temperature, a charging amount, and a discharging state) of pieces of information configuring the metadata are overlaid on the 360-degree VR image. In addition to the pieces of information, mixed reality content where metadata such as a camera manufacturer, camera rig information, a serial number, a time stamp, and a kind of a projection is overlaid on the 360-degree VR image may be displayed. The metadata may be information useful for a manager managing a server rather than general users, and thus, may be provided to an electronic device of the manager.

FIG. 7 is a flowchart illustrating a mixed reality content providing method according to an embodiment of the present invention.

Referring to FIG. 7, in step S710, an operation of obtaining a plurality of images generated by photographing a 360-degree region, device information, and capture information from the image obtainer 100 (see FIG. 1) may be performed. The image obtainer 100 may include a plurality of cameras for capturing a 360-degree VR image, or may include one camera capable of rotating by 360 degrees.

Subsequently, in step S720, an operation of stitching the plurality of images to generate one 360-degree VR image may be performed by the stitching unit 310 (see FIG. 1).

Subsequently, in step S730, an operation of converting the 360-degree VR image into a 360-degree VR image based on a selected projection may be performed by the image converter 320 (see FIG. 1). The selected projection may be, for example, the equirectangular projection, the sphere projection, the cube projection, the mirror ball projection, or the Mercator's projection.

Subsequently, in step S740, an operation of recognizing an OOI included in the 360-degree VR image based on the selected projection to obtain target object recognition information by using supervised learning based on big data may be performed by the target object recognizer 330 (see FIG. 1). Here, the target object recognition information may include pieces of information associated with a target object name of the OOI, a type of the selected projection, and a position and a size of the OOI in the 360-degree VR image based on the selected projection.

Subsequently, in step S750, an operation of sensing a state of the real target object 10 corresponding to the OOI to obtain sensing information may be performed by the sensor unit 200 (see FIG. 1). Here, the sensing information may include, for example, GPS information and state information about the real target object 10. The state information may be information representing a physical amount, a static state, and a dynamic state of the real target object 10, and for example, may include information representing a size, a temperature state, a noise state, a heating state, and a charging state of the real target object 10.

Subsequently, in step S760, an operation of generating metadata based on the device information, the capture information, the target object recognition information, and the sensing information may be performed by the mixed reality managing server 360 or the metadata generator 360B-1 of the mixed reality managing server 360 (see FIG. 1). Here, the metadata may include a device ID table generated based on the device information, a capture ID table generated based on the capture information, a target object ID table generated based on the target object recognition information, and a sensing information ID table generated based on the sensing information.

Subsequently, in step S770, an operation of mapping the metadata and the 360-degree VR image to transmit the mapped metadata and 360-degree VR image to the electronic device 400 may be performed by the mixed reality managing server 360 (see FIG. 1).

Subsequently, in step S780, an operation of overlaying the metadata on the 360-degree VR image to output, through an HMD or AR glasses, the 360-degree VR image with the metadata overlaid thereon may be performed by the electronic device 400.

FIG. 8 is a flowchart illustrating in detail the operation (S760) of generating metadata illustrated in FIG. 7.

Referring to FIG. 8, in step S761, an operation of generating a device ID table including a manufacturer name of a camera, the number of cameras which have photographed the 360-degree region, camera rig information, and a serial number of each of the cameras, which are extracted from the device information, may be performed. Here, the camera rig information may be information representing an arrangement type where the cameras are arranged, and for example, may include information representing whether the arrangement type of the cameras is a cubic type or a sphere type.

In step S763, an operation of generating a capture ID table including GPS information about the camera, compass information about an image, a time stamp, and a file name of the image, which are extracted from the capture information, may be performed.

In step S765, an operation of generating a target object ID table including a target object name of the OOI, a type of the selected projection, and a position and a size of the OOI included in the 360-degree VR image based on the selected projection, which are extracted from the target object recognition information, may be performed.

In step S767, an operation of generating a sensing information ID table including GPS information and state information about the real target object 10 (see FIG. 1), which are extracted from the sensing information, may be performed.

Subsequently, an operation of generating the metadata including the device ID table, the capture ID table, the target object ID table, and the sensing information ID table may be performed.

The sensing information ID table may further include a target object name of the real target object 10 (see FIG. 1). In this case, the target object name of the real target object may be recognized from a target object name of the OOI.

Figure 9:
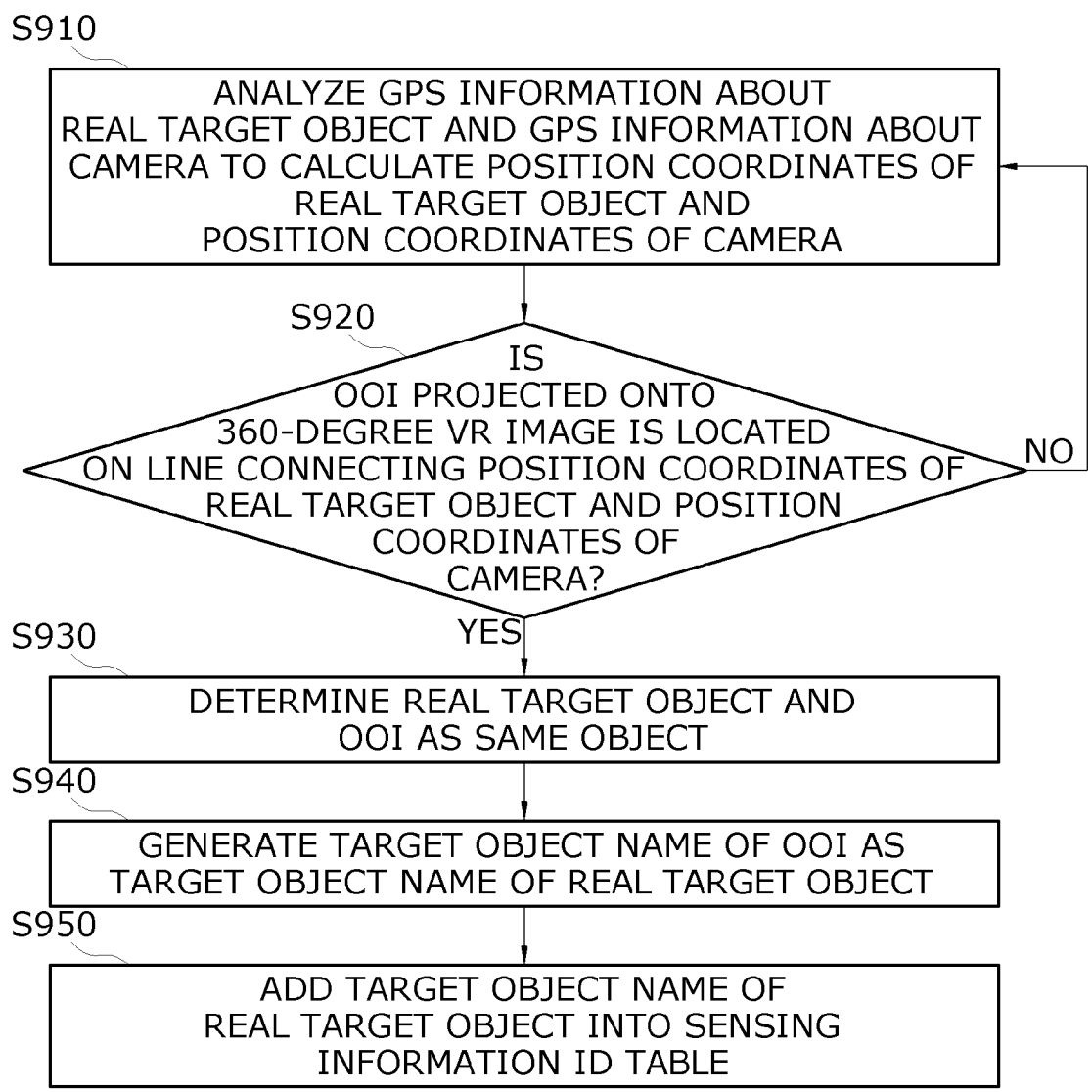
FIG. 9 is a flowchart illustrating in detail an operation of generating a sensing information ID table illustrated in FIG. 8.

FIG. 9 is a flowchart illustrating in detail the operation (S767) of generating a sensing information ID table illustrated in FIG. 8 and is a flowchart illustrating an operation of generating the sensing information ID table including the target object name of the real target object from the target object name of the OOI.

Referring to FIG. 9, in step S910, an operation of analyzing the GPS information about the real target object and the GPS information about the camera to calculate position coordinates of the real target object and position coordinates of the camera may be performed.

Subsequently, in step S920, an operation of checking whether an OOI projected onto the 360-degree VR image is located on a line connecting the position coordinates of the real target object and the position coordinates of the camera may be performed. Whether the OOI projected onto the 360-degree VR image is located on the line may be checked by analyzing compass information about an image region where the OOI is included in the 360-degree VR image.

When it is checked that the OOI projected onto the 360-degree VR image is located on the line, an operation of determining the real target object and the OOI as the same object may be performed in step S930.

Subsequently, in step S940, an operation of generating the target object name of the OOI, obtained through object recognition by the target object recognizer 330 (see FIG. 1), as the target object name of the real target object may be performed.

Subsequently, in step S950, an operation of adding the generated target object name of the real target object into the sensing information ID table may be performed.

Figure 10:
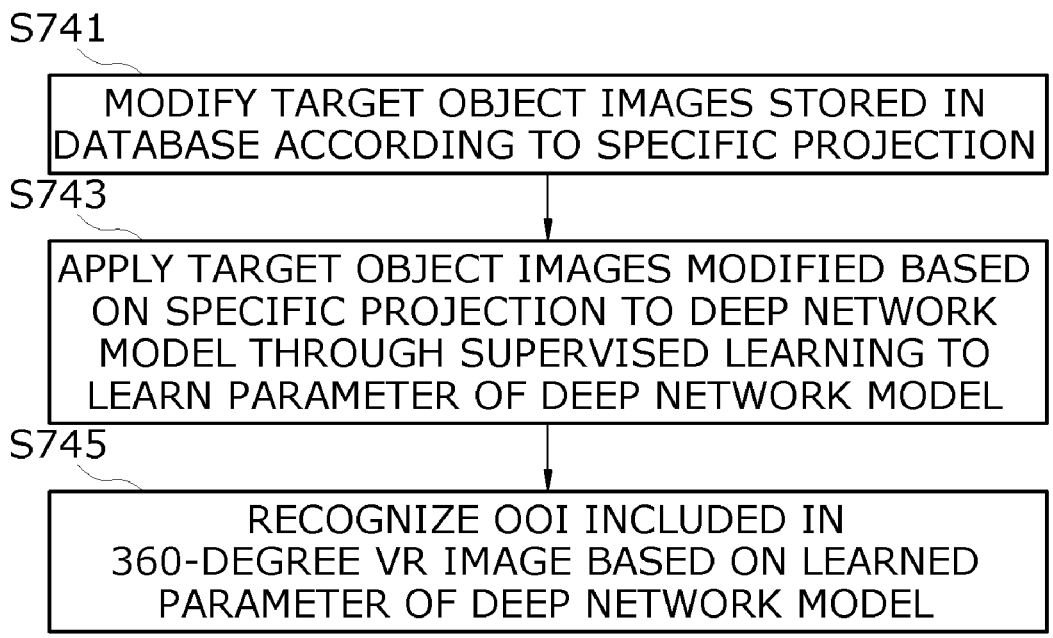
FIG. 10 is a flowchart illustrating in detail an operation of obtaining target object recognition information illustrated in FIG. 7.

FIG. 10 is a flowchart illustrating in detail the operation (S740) of obtaining target object recognition information illustrated in FIG. 7.

Referring to FIG. 10, first, in step S741, an operation of modifying a plurality of target object images stored in a database according to a specific projection may be performed.

Subsequently, in step S743, an operation of applying the plurality of target object images modified based on the specific projection to a deep network model through supervised learning to learn a parameter of the deep network model may be performed.

Subsequently, in step S745, an operation of recognizing the OOI included in the 360-degree VR image based on the learned parameter of the deep network model may be performed.

As described above, according to the embodiments of the present disclosure, the mixed reality content providing apparatus may recognize an OOI included in a 360-degree VR image to generate metadata of the OOI and may provide a user with mixed reality content where the metadata is overlaid on the 360-degree VR image, and thus, the mixed reality content may be used as a solution for analyzing various situations occurring in an industrial site in real time.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A mixed reality content providing method comprising:
   obtaining a plurality of images generated by photographing a 360-degree region, device information, and capture information from an image obtainer including a plurality of cameras;
   stitching the plurality of images to generate one 360-degree virtual reality (VR) image;
   converting the one 360-degree VR image into a 360-degree VR image based on a selected projection;
   recognizing a target object of interest (OOI) included in the 360-degree VR image based on the selected projection to obtain target object recognition information;
   sensing, by a sensor unit, a state of a real target object corresponding to the OOI to obtain sensing information;
   generating metadata, based on the device information, the capture information, the target object recognition information, and the sensing information;
   mapping the metadata and the 360-degree VR image based on the selected projection to generate mixed reality content and providing the mixed reality content to an electronic device; and
   after the providing, by the electronic device, overlaying a text corresponding to the metadata on the 360-degree VR image based on the selected projection,
   wherein the overlaying of the text on the 360-degree VR image based on the selected projection is selectively performed.

2. The mixed reality content providing method of claim 1, wherein the generating of the metadata comprises:
   generating a device identifier (ID) table including a manufacturer name of a camera, number of cameras which have photographed the 360-degree region, camera rig information, and a serial number of each of the cameras, which are extracted from the device information;
   generating a capture ID table including global positioning system (GPS) information about the camera, compass information about an image, a time stamp, and a file name of the image, which are extracted from the capture information;
   generating a target object ID table including a target object name of the OOI, a type of the selected projection, and a position and a size of the OOI included in the 360-degree VR image based on the selected projection, which are extracted from the target object recognition information;
   generating a sensing information ID table including GPS information and state information about the real target object, which are extracted from the sensing information; and
   generating the metadata including the device ID table, the capture ID table, the target object ID table, and the sensing information ID table.

3. The mixed reality content providing method of claim 2, wherein the camera rig information is information representing an arrangement type where the plurality of cameras are arranged.

4. The mixed reality content providing method of claim 2, wherein
   the sensing information ID table further comprises a target object name of the real target object, and
   the target object name of the real target object is recognized from the target object name of the OOI.

5. The mixed reality content providing method of claim 2, wherein the generating of the sensing information ID table comprises:
   determining whether the real target object and the OOI are the same target object, based on the GPS information about the real target object, the GPS information about the camera, and the compass information about the image;
   when the real target object and the OOI are the same target object, generating the target object name of the OOI as the target object name of the real target object; and
   adding the target object name of the real target object into the sensing information ID table.

6. The mixed reality content providing method of claim 1, wherein the obtaining of the target object recognition information comprises recognizing the OOI by using an image recognition method based on a feature vector extracted from the one 360-degree VR image or an image recognition method based on deep learning.

7. The mixed reality content providing method of claim 1, wherein the obtaining of the target object recognition information comprises:
   modifying a plurality of target object images stored in a database, based on a specific projection;
   applying the modified plurality of target object images to a deep network model through supervised learning to learn a parameter of the deep network model; and
   recognizing the OOI included in the one 360-degree VR image, based on the parameter.

8. A mixed reality content providing apparatus comprising:
   an image obtainer including a plurality of cameras and outputting a plurality of images generated by photographing a 360-degree region with the plurality of cameras, device information about the plurality of cameras, and capture information generated in an operation of capturing the plurality of images;
   a stitching unit stitching the plurality of images to generate one 360-degree virtual reality (VR) image, the stitching unit being implemented as at least one processor;
   an image converter converting the one 360-degree VR image into a 360-degree VR image based on a selected projection;

an object recognizer outputting target object recognition information obtained by recognizing a target object of interest (OOI) included in the 360-degree VR image based on the selected projection;

a sensor unit sensing a state of a real target object corresponding to the OOI to output sensing information; and a mixed reality managing server generating metadata, based on the device information, the capture information, the target object recognition information, and the sensing information, mapping the metadata and the 360-degree VR image based on the selected projection to generate mixed reality content, and providing the mixed reality content to an electronic device for displaying the mixed reality content.

9. The mixed reality content providing apparatus of claim 8, wherein the mixed reality managing server generating the metadata which includes a device identifier (ID) table including a manufacturer name of a camera, number of cameras which have photographed the 360-degree region, camera rig information, and a serial number of each of the cameras, which are extracted from the device information, a capture ID table including global positioning system (GPS) information about the camera, compass information about an image, a time stamp, and a file name of the image, which are extracted from the capture information, a target object ID table including a target object name of the OOI, a type of the selected projection, and a position and a size of the OOI included in the 360-degree VR image based on the selected projection, which are extracted from the target object recognition information, and a sensing information ID table including GPS information and state information about the real target object, which are extracted from the sensing information.

10. The mixed reality content providing apparatus of claim 9, wherein the sensing information ID table further comprises a target object name of the real target object recognized from the target object name of the OOI.

11. The mixed reality content providing apparatus of claim 9, wherein the mixed reality managing server determines whether the real target object and the OOI are the same target object, based on the GPS information about the real target object, the GPS information about the camera, and the compass information about the image, and when the real target object and the OOI are the same target object, generates the target object name of the OOI as the target object name of the real target object and adds the target object name of the real target object into the sensing information ID table.

12. The mixed reality content providing apparatus of claim 8, wherein the target object recognizer recognizes the OOI by using an image recognition method based on a feature vector extracted from the one 360-degree VR image or an image recognition method based on deep learning.

13. The mixed reality content providing apparatus of claim 8, wherein the target object recognizer modifies a plurality of target object images stored in a database, based on a specific projection, applies the modified plurality of target object images to a deep network model through supervised learning to learn a parameter of the deep network model, and recognizes the OOI included in the one 360-degree VR image, based on the parameter.

* * * * *